United States Patent Office 3,642,769
Patented Feb. 15, 1972

3,642,769
ARYLAZODIALKYLAMINOALKYL(2 - AMINO-4-ACETYLALKINOPHENYL) ETHER DYESTUFFS
Karl-Ludwig Moritz, Cologne-Stammheim, and Carl Taube, Leverkusen, Germany, assignors to Farbenfabriken Bayer Aktiengesellschaft, Leverkusen, Germany
No Drawing. Filed July 5, 1968, Ser. No. 742,706
Claims priority, application Germany, July 15, 1967,
F 52,979
Int. Cl. C09b 43/12; D06p 1/06
U.S. Cl. 260—207          11 Claims

ABSTRACT OF THE DISCLOSURE

Azo dyestuffs of the formula

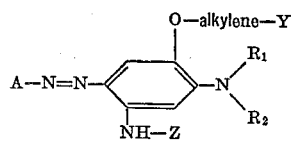

wherein A, Z, Y, $R_1$, $R_2$ and alkylene as defined hereinbelow are prepared particularly for use in dyeing and printing of tannin treated cotton and polymers or copolymers of acrylonitrile or a symmetrical dicyanoethylene, or acid modified polyester fibers, as well as condensation products from sulfoterephthalic acid and ethylene glycol wherein the dyestuffs exhibit good fastness properties.

---

The present invention relates to new azo dyestuffs of the formula

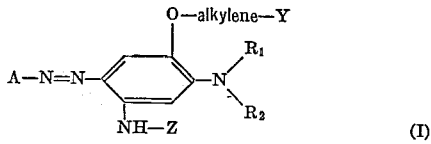     (I)

In this formula, A denotes an aromatic-carbocyclic or aromatic-heterocyclic radical, "alkylene" stands for a lower straight-chain or branched alkylene radical, $R_1$ and $R_2$ mean hydrogen, an optionally substituted alkyl, aryl or aralkyl radical where the alkyl radicals together may form part of a hetero ring; Y stands for a tertiary amino group or a quaternary ammonium group, and Z means an acyl radical.

Radicals of tertiary amino groups Y are, for example, dialkylamino groups with straight-chain or branched, optionally further substituted alkyl radicals with 1–8 carbon atoms; alkyl-arylamino groups preferably containing aryl radicals of the benzene series which may be further substituted; alkyl-aralkylamino groups; 1-N-alkyl-hydrazino groups; N,N-dialkylamino groups in which the alkyl groups together form part of a hetero ring, such as N-morpholino and N-piperidino groups. Suitable quaternary ammonium groups in the meaning of the present invention are, for example, trialkyl-ammonium groups which are linked to the alkylene groups of the Formula I and in which the alkyl radicals are straight-chain or branched, optionally substituted and preferably contain 1–8 carbon atoms; N,N-dialkyl-N-aryl- or -aralkyl-ammonium groups in which the aryl radicals preferably are radicals of the benzene series which may be further substituted; ammonium groups in which the nitrogen atom of the ammonium forms part of a hetero ring, as e.g. in the case of the pyridinium radical, i.e. a cycloammonium group; N-alkyl-N-cycloamino groups, such as N-alkyl-morpholino or -piperidino groups, 1,1-N-dialkyl-hydrazonium, N,N-dialkyl-N-oxide groups and the like. Particular examples of suitable tertiary amino or quaternary ammonium groups Y are:

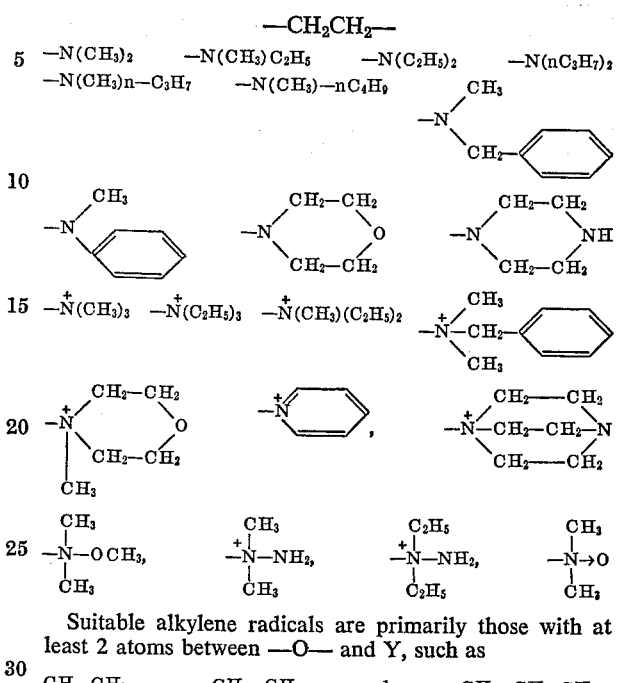

Suitable alkylene radicals are primarily those with at least 2 atoms between —O— and Y, such as $$-\underset{CH_3}{\underset{|}{CH}}-CH_2-, \quad -CH_2-\underset{CH_3}{\underset{|}{CH}}-, \quad \text{and} \quad -CH_2-\underset{OH}{\underset{|}{CH}}-CH_2-$$

Suitable acyl radicals Z are, for example, alkylcarbonyl, aryl-carbonyl, alkoxy-carbonyl, alkyl-sulphonyl, aryl-sulphonyl or (alkyl)-aminocarbonyl radicals with 1–10 carbon atoms.

Preferred dyestuffs of the Formula I are those which contain no sulphonic acid and carboxylic acid groups in A and the other radicals and in which "alkylene" is —$CH_2$—$CH_2$—, Z is an acyl radical and $R_1$ and $R_2$ are alkyl, hydroxyalkyl, acetoxy-alkyl, alkoxyalkyl, cyanoalkyl radicals with 1–6 carbon atoms in the alkyl radicals.

In the absence of sulphonic acid and carboxylic acid groups, the new dyestuffs (I) can be present in the form of the free bases or of salts. In the last-mentioned case, the anionic radicals X in compounds of the formula

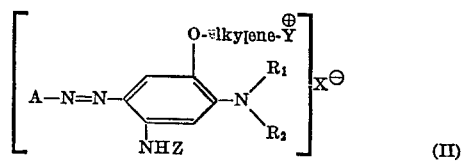     (II)

can be inorganic as well as organic ions; examples are: $Cl^-$, $Br^-$, $I^-$, $CH_3SO_4^-$, $C_2H_5SO_4^-$, p-toluene-sulphonate-, $HSO_4^-$, benzene-sulphonate-, p-chlorobenzene-sulphonate, phosphate-, acetate-, formate-, propionate-, butyrate-, oxalate-, lactate-, maleinate-, succinate-, crotonate-, tartrate-, citrate-, $BF_4^-$ $NO_3^-$, perchlorate-, $ZnCl_3^-$. The type of anionic radicals is of no importance for the properties of the dyestuffs, provided they are substantially colourless radicals which do not impair the solubility of the dyestuff in an undesirable manner.

The new dyestuffs may otherwise contain any substituents customary in azo dyestuffs, such as alkyl groups with 1–6 carbon atoms, aryl radicals, aralkyl, sulphonamide, substituted sulphonamide, sulphone, carbonamide, carboxylic acid ester, nitro, cyano, fluoro, chloro, bromo, trifluoromethyl groups; lower alkoxy groups with 1–3 carbon atoms; amino, alkylamino, arylamine, aralkylamino, acylamino, hydroxyl groups; cyanoalkyl, haloalkyl, hydroxyalkyl, alkoxyalkyl, acyloxyalkyl, alkylcarbonylalkyl, carbalkoxyalkyl, carbonylalkyl, phenoxyl, acyloxyl, alkoxycarbonyloxyl, alkylthiol, thiocyano, alkylsulphoxyl, alkylsulphonyl, carbamic acid alkyl ester, urea; they are preferably free from sulphonic acid and carboxylic acid groups.

The new dyestuffs are obtained by combining a diazotised amine of the formula $$A-NH_2 \quad (III)$$

in which A has the same meaning as above, with a coupling component of the formula

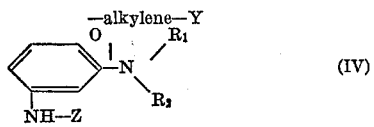

(IV)

in which Y, Z, $R_1$ and $R_2$ have the same meaning as above. Coupling of the starting components is carried out in the usual manner in an aqueous, preferably acidic solution or suspension.

Diazo components (III) which are suitable for the production of the new azo dyestuffs are, for example: 4-cyanoaniline, 4-nitroaniline, 4-nitro-2-chloroaniline, 2,4-dicyanoaniline, 2,4-dinitroaniline, 3-chloro-4-cyanoaniline, 2-cyano-5-chloroaniline, 3,4-dicyanoaniline, 2,6-dichloro-4-nitroaniline, 2-chloro-4-cyanoaniline, 2-trifluoromethyl-4-chloro-aniline, 3,5-bistrifluoromethyl-aniline, 2-ethylsulphonyl-5-trifluoromethyl-aniline, 4-amino-acetophenone, 2-amino-5-nitrotoluene, 2-amino-5-nitroanisole, 3-nitro-4-aminotoluene, 2,4-dichloroaniline, 2,5-dichloro-4-nitroaniline, 3-chloro-4-amino-1-trifluoromethylbenzene, 2-cyano-4,5,6-trichloroaniline, 2,4 - dinitro - 6 - bromoaniline, 2-cyano-4,6-dinitroaniline, 2-cyano-6-bromo- or -6-chloro-4-nitroanline, 2,4-dicyano-6-chloroaniline, 2-methoxy-4-nitroaniline, 2-amino-5-nitro-benzoic acid methyl ester, 4-amino-benzoic acid alkyl amides, such as methyl- or di-methylamide, 4-amino-benzoic acid methyl ester, 3-nitro-4-aminobenzoic acid butyl ester, 1-aminobenzene-3- or -4-methyl-sulphone or -ethylsulphone, further 2-amino-1,3-thiazole, 2-amino-benzothiazole, 3-amino-1,2,4-triazole, 2-amino-1,3,4-thiadiazole, 3-amino-indazole, 2-aminobenzimidazole, 2-amino-pyridine, 2 - amino-quinoline, and their derivatives substituted by alkyl, aryl, aralkyl, halogen, nitro, alkylsulphonyl, cyanogen etc.

The following examples may be mentioned from the great number of suitable coupling components (IV):

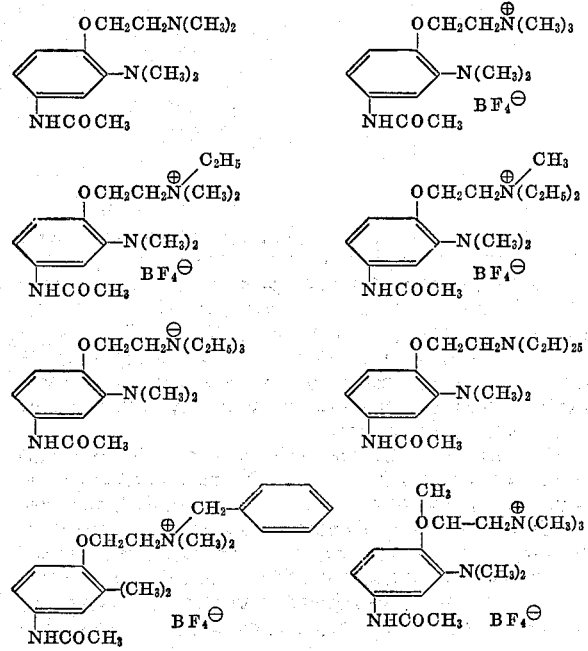

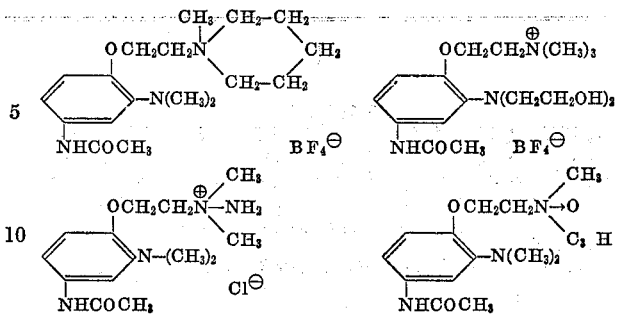

Coupling components of the Formula IV can be prepared, for example, according to the following process: 2,4-dinitrochlorobenzene is reacted with the alkali metal salt of N,N-$R_1R_2$aminoethanol to form the β-N,N-$R_1R_2$-aminoethyl-2,4-dinitrophenyl ether

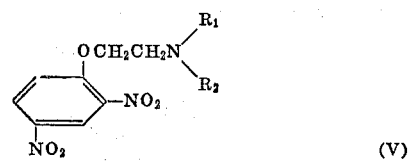

(V)

V can also be obtained by nitration of the β-N,N-$R_1R_2$ aminoethyl-4-nitrophenyl ethers obtainable, for example, according to J. A. Kaye, W. J. Burlant and L. Price, J. Org. Chem. 16, 1421 (1951). V is reduced with tin(II) chloride to form the 2-amino-4-nitrophenyl ether, this is mono- or dialkylated with alkylating agents such as p-toluene-sulphonic acid alkyl ester, dialkyl sulphate or alkyl halides, and after catalytic reduction of the nitro groups, for example, with Raney nickel, acylation is performed in the usual manner with acid chlorides or anhydrides. The tertiary amino group may subsequently be quaternised with the usual alkylating agents. Suitable agents for quaternisation are, for example, the esters of strong mineral acids and organic sulphonic acids with preferably low-molecular alcohols, such as alkyl chlorides or bromides, aralkyl halides, dialkyl sulphates, and esters of sulphonic acids of the benzene series, such as the methyl, ethyl, propyl, n-butyl esters of benzene-sulphonic acid, p-methylbenzene-sulphonic acid, p-chlorobenzene-sulphonic acid and p-nitrobenzene-sulphonic acid. The reaction is preferably carried out in an aqueous solution or suspension with molar amounts of the alkylating agent.

It is also possible to carry out the quaternisation of the tertiary amino group with the aforesaid quaternising agent already at the stage of the dinitro compound (V), expediently in inert organic solvents. Inert organic solvents which may be used are, for example, high-boiling aliphatic, cycloaliphatic or aromatic hydrocarbons, and also stable aliphatic or cyclic halogen compounds, such as carbon tetrachloride, tetrachloroethylene, mono- or dichlorobenzene, and nitrobenzene.

Summarizing the disclosure, the dyestuffs generally are of the formula

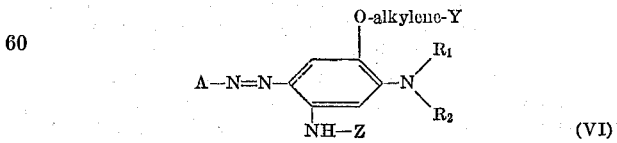

(VI)

where A stands for

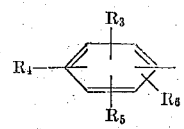

wherein:

$R_3$ stands for chloro, bromo, fluoro, trifluoromethyl, nitro, cyano, methylsulfone, ethylsulfone, sulfonamide, sulfonemethylamide, sulfodimethylamide, carbonamide, carbodimethyl- or -methylamide, carbomethoxy, carboethoxy, carbobutoxy or carbophenoxy methyl, methoxy or ethoxy;

$R_4$, $R_5$ and $R_6$ independently of one another are hydrogen or chloro, bromo, fluoro, trifluoromethyl, nitro, cyano, methylsulfone, ethylsulfone, sulfonamide, sulfomethylamide, sulfodimethylamide, carbonamide, carbodimethyl or -methylamide, carbomethoxy, carboethoxy, or carbophenoxy, methyl, methoxy, or ethoxy; alkylene stands for lower alkylene having 1–5 carbon atoms which can contain a hydroxy substituent;

$R_1$ and $R_2$ stand for hydrogen, lower alkyl, lower alkyl substituted by a member selected from the group consisting of hydroxy, chloro, cyano and acetoxy;

Y is a tertiary amino group selected from the group consisting of dialkylamino containing 1–8 carbon atoms, N-methyl-N-phenylamino, N-methyl-N-benzylamino, or Y is a quaternary ammonium compound selected from the group consisting of trilower alkyl ammonium, dilower alkyl N-oxide, 1,1-dilower alkyl hydrazinium, N,N-dimethyl-N-benzyl ammonium or a radical and

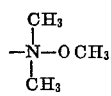

z stands for an acyl residue selected from the group consisting of lower alkyl carbonyl, lower alkyl sulfonyl, aminocarbonyl and chlorophenylcarbonyl.

Within this formulae preferred dyestuffs include those of the formulae:

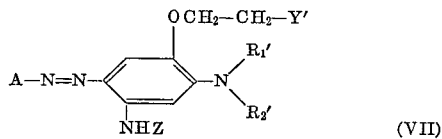

(VII)

wherein:

Y' stands for a quaternary ammonium group of (VI); $R_1'$ is hydrogen or a lower alkyl group of (VI); and $R_2'$ is a lower alkyl group of (VI); and

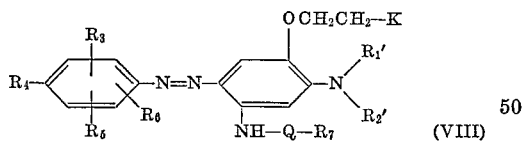

(VIII)

wherein:

$R_3$ stands for chloro, bromo, fluoro, trifluoromethyl, nitro, cyano, methylsulfone, ethylsulfone, sulfonamide, sulfone-methylamide, sulfodimethylamide, carbonamide, carbodimethyl- or -methylamide, carbomethoxy, carboethoxy or carbophenoxy, methyl, methoxy or ethoxy, $R_4$, $R_5$ and $R_6$, independently of one another, are hydrogen, or chloro, bromo, fluoro, trifluoromethyl, nitro, cyano, methylsulfone, ethylsulfone, sulfonamide, sulfomethylamide, sulfodimethylamide, carbonamide, carbodimethyl or -methylamide, carbomethoxy, carboethoxy, carbophenoxy, methyl, methoxy or ethoxy;

Q is CO or $SO_2$; $R_7$ stands for lower alkyl or chlorophenyl; K stands for dialkylamino with 1–8 carbons in the alkyl group, trilower alkyl ammonium, dilower alkyl-N-oxide, or 1,1-dilower alkyl hydrazinium;

$R_1'$ stands for hydrogen, lower alkyl or lower alkyl substituted by a member of the group hydroxy, acetoxy, cyano and chloro; and $R_2'$ stands for lower alkyl and lower alkyl substituted by a member of the group hydroxy, acetoxy, cyano and chloro, the dyestuffs being free of sulfonic acid and carboxylic acid groups; and

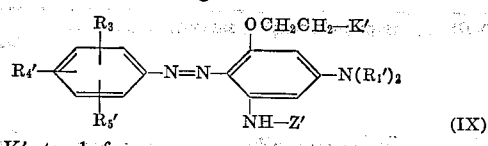

(IX)

wherein K' stands for

$R_3'$ stands for hydrogen, trifluoromethyl, cyano or nitro, $R_4'$ stands for chloro, nitro or lower alkyl sulphonyl, $R_5'$ stands for hydrogen, bromo or cyano, Z' stands for lower alkyl carbonyl, $R_1'$ stands for lower alkyl and L stands for lower alkyl having 1–2 carbon atoms or $NH_2$, the dyestuff being free of sulfonic acid and carboxylic acid groups.

The new dyestuffs are valuable products which are suitable for the dyeing and printing of tannin-treated cotton and, preferably, of polymers and copolymers of acrylonitrile or asym. dicyanoethylene. On the last-mentioned materials, in particular, there are obtained dyeings and prints of good to very good fastness properties. The dyestuffs are also suitable for dyeing and printing acid-modified polyester fibres as well as condensation products from sulphoterephthalic acid and ethylene glycol.

The parts given in the following examples are parts by weight, unless otherwise stated; the temperatures are given in degrees centigrade.

EXAMPLE 1

24.2 g. (0.1 mole) 2-cyano-4-nitro-6-bromo-aniline are diazotised at 0° in 200 ml. glacial acetic acid/propionic acid (3:1) with 15 ml. nitrosyl-sulphuric acid containing 0.11 mole nitrous acid. The excess nitrous acid is destroyed after 1½ hours by the addition of solid amidosulphonic acid. This diazonium salt solution is poured at 0–5°, while stirring, into a solution of 38 g. (0.11 mole) of the $HBF_4$ salt of β-N,N-dimethyl-aminoethyl-(2-dimethylamino-4-acetylamino-phenyl) ether in 1.5 litres of water, which has been slightly acidified with acetic acid. The dyestuff solution is subsequently neutralised to a pH of 3.5 with a 20% sodium acetate solution, some sodium chloride is added, the precipitated dyestuff is filtered off with suction and washed on the suction filter with a 10% sodium chloride solution. The dried dyestuff has the constitution

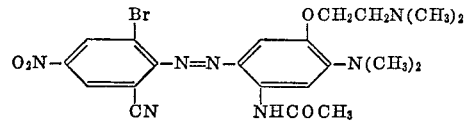

The dyestuff can be recrystallised from boiling water with the addition of sodium chloride. The dyestuff dyes fibres and fabrics of polyacrylonitrile in reddish blue shades of good fastness properties.

The coupling component used in the present example was obtained by catalytically hydrogenating β-N,N-dimethylaminoethyl-2,4-dinitrophenyl ether (M.P. 102–105°) with Raney nickel in methanol and subsequently, without intermediate isolation, partially acylating with molar amounts of acetic acid anhydride on the amino group in the para-position to the ether grouping. The partially acetylated ether so obtained can be directly worked up from this solution. For isolation, the solvent is substantially removed in a vacuum, the acylamino compound is separated, for example, by the addition of aqueous $HBF_4$ as $HBF_4$ addition product and recrystallised from methanol or methanol/water (M.P. 174–175°).

The β-N,N-dimethyl-aminoethyl - 2,4 - dinitrophenyl ether can be quaternised, for example, with dimethyl sulphate (pale yellow needles, M.P. 148–151°). Hydrogenation and partial acetylation are carried out as described above.

The following compounds can be obtained in this way:

| Compound | Melting point, °C. |
|---|---|
| 2-acetylamino-4-amino-1-(β-dimethylaminoethoxy)-benzene · HBF₄ [OCH₂CH₂N(CH₃)₂ / –NH₂ / NHCOCH₃] | 174–175 |
| [OCH₂CH₂N(C₂H₅)₂ / –NH₂ / NHCOCH₃] · HBF₄ | 238–240 |
| [OCH₂CH₂N⁺(CH₃)₃ / –NH₂ / NHCOCH₃] · BF₄⁻ · HBF₄ | 228–231 |
| [OCH₂CH₂N⁺(CH₃)₂(C₂H₅) / –NH₂ / NHCOCH₃] · BF₄⁻ · HBF₄ | 226–228 |
| [OCH₂CH₂N(CH₃)(CH₃) with CH₃ / –NH₂ / NHCOCH₃] · BF₄⁻ · HBF₄ | 225–227 |
| [OCH₂CH₂N⁺(C₂H₅)₃ / –NH₂ / NHCOCH₃] · BF₄⁻ · HBF₄ | 215–219 |
| [OCH₂CH₂N⁺(CH₃)₂(CH₂–C₆H₅) / –NH₂ / NHCOCH₃] · BF₄⁻ · HBF₄ | 259–261 |
| [OCHCH₂N⁺(CH₃)₃ with CH₃ / –NH₂ / NHCOCH₃] · BF₄⁻ · HBF₄ | 245–248 |

The resultant amino compounds can then be reductively alkylated in the form of the free bases or as BF₄ salts in methanol or aqueous methanol together with excess paraformaldehyde (molar ratio 1:2.5–3), in the presence of Raney nickel. The compounds thus obtained, which are dimethylated on the amino group in the ortho-position to the ether grouping, can directly be used for coupling. The compounds can also be separated in crystalline form, after removal of the solvent in a vacuum and, if desired, by the addition of HBF₄ or the like, and recrystallised from methanol or aqueous methanol. The following compounds are obtained in this way:

| Compound | Melting point, °C. |
|---|---|
| [OCH₂CH₂N(CH₃)₂ / –N(CH₃)₂ / NHCOCH₃] · HBF₄ | 70–72 |
| [OCH₂CH₂N(C₂H₅)₂ / –N(CH₃)₂ / NHCOCH₃] (Prepared via the free base) | 95–98 |
| [OCH₂CH₂N⁺(CH₃)₃ / –N(CH₃)₂ / NHCOCH₃] · BF₄⁻ · HBF₄ | 218–221 |
| [OCH₂CH₂N⁺(CH₃)₂(C₂H₅) / –N(CH₃)₂ / NHCOCH₃] · BF₄⁻ · HBF₄ | 226–229 |
| [OCH₂CH₂N⁺(C₂H₅)₂(CH₃) / –N(CH₃)₂ / NHCOCH₃] · BF₄⁻ · HBF₄ | 232–234 |
| [OCH₂CH₂N⁺(C₂H₅)₃ / –N(CH₃)₂ / NHCOCH₃] · BF₄⁻ | 200–203 |
| [OCH₂CH₂N⁺(CH₃)₂(CH₂–C₆H₅) / –N(CH₃)₂ / NHCOCH₃] · BF₄⁻ | 243–245 |
| [OCHCH₂N⁺(CH₃)₃ with CH₃ / –N(CH₃)₂ / NHCOCH₃] · BF₄⁻ · HBF₄ | 238–242 |

It is also possible to alkylate the amines, for example, with dialkyl sulphates. The stated coupling components can be reacted in the process of the present example to form valuable azo dyestuffs.

EXAMPLE 2

19.75 g. (0.1 mole) 2-cyano-4-nitro-6-chloroaniline are diazotised as described in Example 1. The diazonium salt solution is poured at 0–5°, while stirring, into a solution of 32.2 g. (0.11 mole) β-N,N-diethylaminoethyl)-(2-dimethylamino-4-acetylaminophenyl) ether in 1.5 litres of water, which has been slightly acidified with acetic acid. After neutralisation with a 20% sodium acetate solution, the dyestuff thus precipitated in crystalline form is filtered off with suction and washed on the suction filter with a 10% sodium chloride solution. The dried dyestuff corresponds to the formula

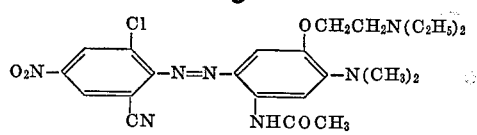

and dyes fibres and fabrics of polyacrylonitrile in neutral blue shades of good fastness properties.

EXAMPLE 3

25.3 g. (0.1 mole) 2-ethylsulphonyl-5-trifluoromethyl-aniline are diazotised in the usual manner at 0–5° in an aqueous hydrochloric acid solution with a 10% solution of 6.9 g. NaNO₂. The clarified diazonium salt solution is poured into a solution of 50.0 g. (0.11 mole) of the HBF₄ salt of N,N,N-trimethyl-N-(2-dimethylamino-4-acetylamino-phenoxyethyl)-ammonium fluoborate in 1.5 litres of water, which has been buffered with acetic acid/sodium acetate. After neutralisation to pH 3.5 with a 20% sodium acetate solution, the dyestuff thus precipitated in crystalline form and corresponding to the formula

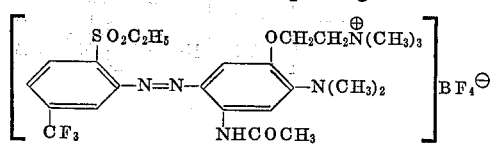

is filtered off with suction, washed on the suction filter with a 10% sodium chloride solution and dried. The dyestuff can be recrystallised from boiling water by salting out with NaCl and dyes fibres and fabrics of polyacrylonitrile in clear bluish red shades of good fastness properties.

EXAMPLE 4

19.55 g. (0.1 mole) 2-trifluoromethyl-4-chloroaniline are diazotised at 0° in 200 ml. of glacial acetic acid/propionic acid (3:1) with 15 ml. nitrosyl-sulphuric acid containing 0.11 mole nitrous acid. The excess nitrous acid is destroyed after 1½ hours by the addition of solid amidosulphonic acid. The clarified diazonium salt solution is poured at 0–5° while stirring into a solution of 53.5 g. (0.11 mole) of the HBF₄ salt of N,N-diethyl-N-methyl-N-(2 - dimethylamino-phenoxyethyl)-ammonium fluoborate in 1.5 litres of water, which has been buffered with acetic acid/sodium acetate. After further neutralisation with a 20% sodium acetate solution and after the addition of NaBF₄, the dyestuff is precipitated in crystalline form. It is filtered off with suction, washed with a 5% NaCl solution and dried. The dyestuff of the formula

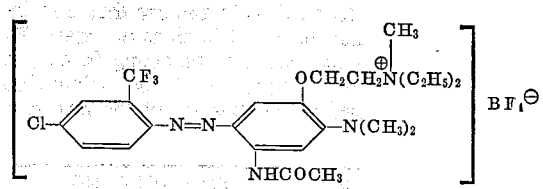

can be recrystallised from boiling water with the addition of NaCl and dyes fibres and fabrics of polyacrylonitrile in clear yellowish scarlet shades of good fastness properties.

EXAMPLE 5

26.2 (0.1 mole) 2,4-dinitro-6-bromo-aniline are diazotised at 0° in 200 ml. glacial acetic acid/propionic acid (3:1) with 15 ml. nitrosyl-sulphuric acid containing 0.11 mole nitrous acid. The excess nitrous acid is destroyed after 1½ hours by the addition of solid amidosulphonic acid. This diazonium salt solution is poured at 0°, while stirring, into a solution of 51.5 g. (0.11 mole) of the HBF₄ salt of N,N-dimethyl-N-ethyl-N-(2-dimethyl-amino-4-acetylamino - phenoxyethyl)-ammonium fluoborate in 1.5 litres of water, which has been slightly acidified with acetic acid. After neutralising the dyestuff solution to a pH of about 3.5 with a 20% sodium acetate solution, the dyestuff thus precipitated in crystalline form is filtered off with suction, washed on the suction filter with a 10% NaCl solution, and dried. The resultant dyestuff of the formula

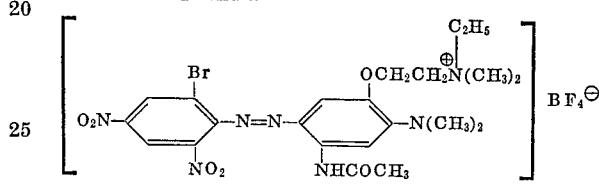

dyes fibres and fabrics of polyacrylonitrile in dull reddish blue shades of good fastness properties.

EXAMPLE 6

19.75 g. (0.1 mole) 2-cyano-4-nitro-6-chloroaniline are diazotised as described in Example 2 and coupled with 54.6 g. (0.11 mole) of the HBF₄ addition product of N,N,N-triethyl - N-(2-dimethylamino - 4 - acetylamino-phenoxyethyl)-ammonium fluoborate. The resultant dyestuff of the formula

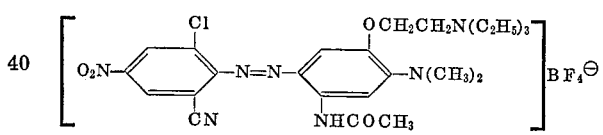

dyes fibres and fabrics of polyacrylonitrile in clear blue shades of good fastness properties.

In an analogous manner, the diazo component of this example can be combined with the coupling component

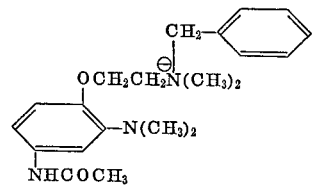

or with the coupling components stated in Example 1.

The dyestuffs given below, which dye fibres and fabrics of polyacrylonitrile in the specified shades, can be obtained from the corresponding starting materials by the methods described in the preceding examples.

| Dyestuff | Shade |
|---|---|
| 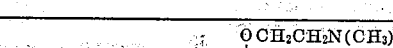 | Reddish orange. |
| 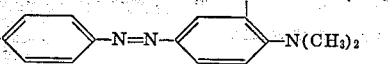 | Yellowish scarlet. |

TABLE—Continued
| Dyestuff | Shade |
|---|---|
| 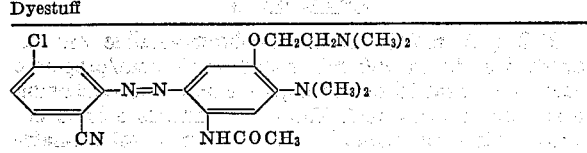 | Bluish red. |
| 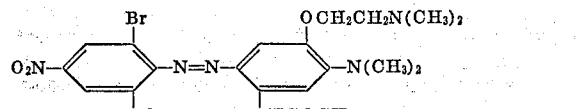 | Dull reddish blue. |
| 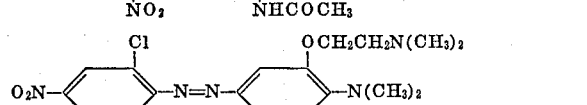 | Blue. |
| 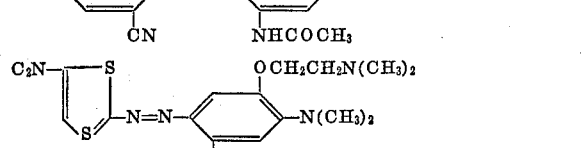 | Greenish blue. |
| 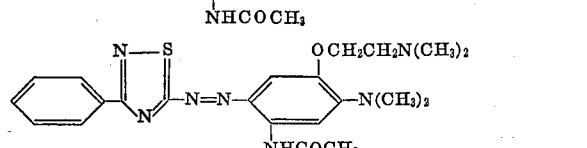 | Reddish violet. |
| 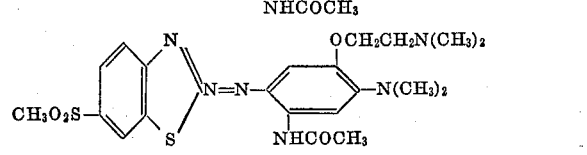 | Bluish violet. |
| 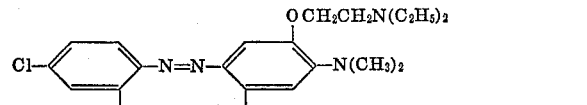 | Yellowish scarlet. |
| 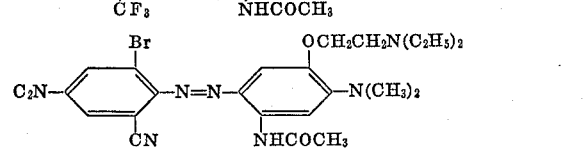 | Blue. |
| 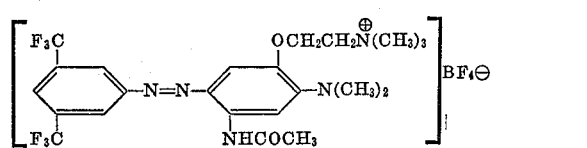 | Orange. |
| 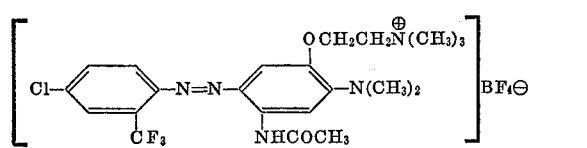 | Scarlet. |
| 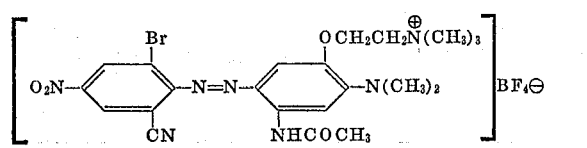 | Blue. |
| 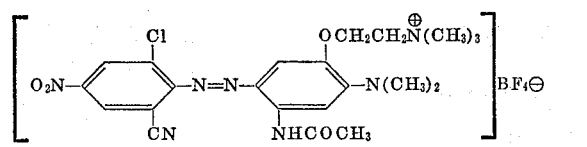 | Do. |
| 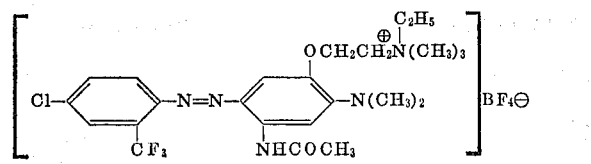 | Yellowish scarlet. |

TABLE—Continued

| Dyestuff | Shade |
|---|---|
| (structure) | Brown-red. |
| (structure) | Bluish red. |
| (structure) | Blue. |
| (structure) | Do. |
| (structure) | Bluish red. |
| (structure) | Blue. |
| (structure) | Do. |
| (structure) | Yellowish scarlet. |
| (structure) | Do. |
| (structure) | Blue. |

TABLE—Continued

| Dyestuff | Shade |
|---|---|
| [structure: O₂N–C₆H₂(Br)(CN)–N=N–C₆H₂(OCH₂CH₂–N⁺(CH₃)(NH₂)(CH₃))(N(CH₃)₂)(NHCOCH₂CH₃)] Cl⁻ | Blue. |
| [structure: phenyl–C(=N–S–)=N–C(–N=N–C₆H₂(OCH₂–N⁺-pyridinium)(NHC₄H₉(n))(NHCONH₂))] CH₃SO₄⁻ | Red-violet. |
| [structure: O₂N–C₆H₃(NO₂)–N=N–C₆H₂(OCH₂CH₂CH₂N⁺(CH₃)₃)(N(CH₂CH₂CN)₂)(NHSO₂CH₃)] CH₃SO₄⁻ | Violet-blue. |
| [structure: O₂N–C₆H₃(CN)–N=N–C₆H₂(OCH₂CH₂–N⁺(CH₃)-morpholine)(N(CH₃)CH₂CH₂Cl)(NHCOCH₃)] CH₃SO₄⁻ | Violet. |
| [structure: O₂N–C₆H₃(Cl)–N=N–C₆H₂(OCH₂CH₂–N⁺(CH₃)₂→O)(N(CH₃)CH₂CH₂CN)(NHCOCH₃)] | Reddish violet. |
| [structure: O₂N–C₆H₂(Cl)(Cl)–N=N–C₆H₂(OCH₂CH₂–N⁺(CH₃)-piperidine)(N(CH₃)₂)(NHCO–C₆H₄–Cl)] ZnCl₃⁻ | Ruby. |
| [structure: Cl–C₆H₃(CN)–N=N–C₆H₂(OCH₂CH₂–N⁺(CH₃)₃)(N-morpholine)(NHCOC₄H₉(n))] CH₃SO₄⁻ | Bluish red. |
| [structure: NC–C₆H₃(CN)–N=N–C₆H₂(OCH₂–N⁺(CH₃)₃)(N(CH₃)₂)(NHCOCH₃)] ZnCl₃⁻ | Do. |
| [structure: (CH₃)₂NO₂S–C₆H₂(Cl)(Cl)–N=N–C₆H₃(OCH₂CH₂N⁺(CH₃)(NH₂)(CH₃))(N(CH₃)₂)(NHCOCH₃)] Cl⁻ | Red. |
| [structure: Cl–C₆H₃(Cl)–N=N–C₆H₂(OCH₂CH₂N⁺(CH₃)₃)(N(CH₃)₂)(NHCOC₂H₅)] BF₄⁻ | Scarlet. |

TABLE—Continued

| Dyestuff | Shade |
|---|---|
| 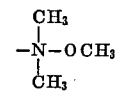 (structure with O₂N-, Br, -N=N-, NHCOOCH₃, OCH₂CH₂N⁺(CH₃)(OCH₃)(CH₃), N(CH₃)₂, Cl⁻) | Violet. |
| (structure with Cl-, CF₃, -N=N-, NHCOCH₃, OCHCH₂N⁺(CH₃)₃ with CH₃, N(CH₃)₂, BF₄⁻) | Yellowish scarlet. |
| (structure with O₂N-, Cl, -N=N-, CN, NHCOCH₃, OCH-CH₂N⁺(CH₃)₃ with CH₃, N(CH₃)₂, BF₄⁻) | Blue. |
| (structure with O₂N-, CN, CN, -N=N-, NHCOCH₃, OCH₂CH₂N⁺(CH₃)₃, N(CH₃)₂, BF₄⁻) | Greenish blue. |

We claim:

1. An azo dyestuff of the formula

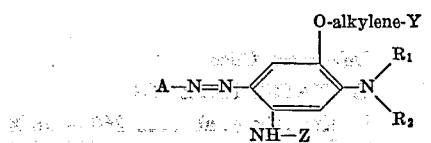

where A stands for

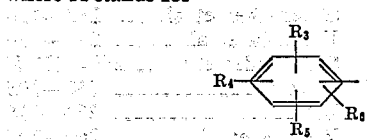

wherein $R_3$ stands for chloro, bromo, fluoro, trifluoromethyl, nitro, cyano, methylsulfone, ethylsulfone, sulfonamide, sulfonemethylamide, sulfodimethylamide, carbonamide, carbodimethyl- or -methylamide, carbomethoxy, carboethoxy, carbobutoxy or carbophenoxy methyl, methoxy or ethoxy;

$R_4$, $R_5$ and $R_6$ independently of one another are hydrogen or chloro, bromo, fluoro, trifluoromethyl, nitro, cyano, methylsulfone, ethylsulfone, sulfonamide, sulfomethylamide, sulfodimethylamide, carbonamide, carbodimethyl or -methylamide, carbomethoxy, carboethoxy, or carbophenoxy, methyl, methoxy, or ethoxy; alkylene stands for lower alkylene having 1-5 carbon atoms which can contain a hydroxy substituent;

$R_1$ and $R_2$ stand for hydrogen, lower alkyl, lower alkyl substituted by a member selected from the group consisting of hydroxy, chloro, cyano and acetoxy;

Y is a tertiary amino group selected from the group consisting of dialkylamino containing 1-8 carbon atoms, N-methyl-N-phenylamino, N-methyl-N-benzylamino, or Y is a quaternary ammonium compound selected from the group consisting of trilower alkyl ammonium, dilower alkyl N-oxide, 1,1-dilower alkyl hydrazinium, N,N-dimethyl-N-benzyl ammonium or a radical and $$-\underset{\underset{CH_3}{|}}{\overset{\overset{CH_3}{|}}{N}}-OCH_3$$

Z stands for an acyl residue selected from the group consisting of lower alkyl carbonyl, lower alkyl sulfonyl, aminocarbonyl and chlorophenylcarbonyl.

2. A dyestuff of claim 1 of the formula

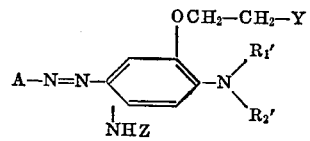

wherein

Y' stands for a quaternary ammonium group of Claim 1;

$R_1'$ is hydrogen or a lower alkyl group of claim 1; and $R_2'$ is a lower alkyl group of claim 1.

3. A dyestuff of claim 1 of the formula

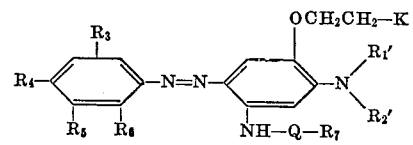

wherein $R_3$ stands for chloro, bromo, fluoro, trifluoromethyl, nitro, cyano, methylsulfone, ethylsulfone, sulfonamide, sulfone-methylamide, sulfodimethylamide, carbonamide, carbodimethyl- or -methylamide, carbomethoxy carboethoxy or carbophenoxy, methyl, methoxy or ethoxy;

$R_4$, $R_5$ and $R_6$, independently of one another, are hydrogen, or chloro, bromo, fluoro, trifluoromethyl, nitro, cyano, methylsulfone, ethylsulfone, sulfonamide, sulfomethylamide, sulfodimethylamide, carbonamide, carbodimethyl or -methylamide, carbomethoxy, carboethoxy or carbophenoxy, methyl, methoxy or ethoxy;

Q is CO or $SO_2$; $R_7$ stands for lower alkyl or chlorophenyl; K stands for dialkylamino with 1-8 carbons in the alkyl group, trilower alkyl ammonium, dilower alkyl-N-oxide, or 1,1 - dilower alkyl hydrazinium;

R₁' stands for hydrogen, lower alkyl or lower alkyl substituted by a member of the group hydroxy, acetoxy, cyano and chloro; and R₂' stands for lower alkyl and lower alkyl substituted by a member of the group hydroxy, acetoxy, cyano and chloro, the dyestuff being free of sulfonic acid and carboxylic acid groups.

4. A dyestuff of claim 1 corresponding to the formula

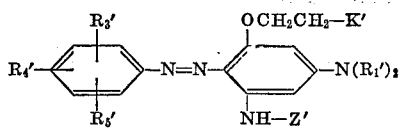

wherein K' stands for

R₃' stands for hydrogen, trifluoromethyl, cyano or nitro, R₄' stands for chloro, nitro or lower alkyl sulphonyl, R₅' stands for hydrogen, bromo or cyano, Z' stands for lower alkyl carbonyl, R₁' stands for lower alkyl and L stands for lower alkyl having 1-2 carbon atoms or NH₂, the dyestuff being free of sulphonic acid and carboxylic acid groups.

5. The dyestuff of claim 1 of the formula

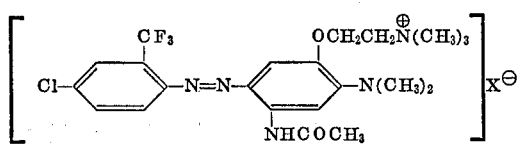

wherein X is an anion.

6. The dyestuff of claim 1 of the formula

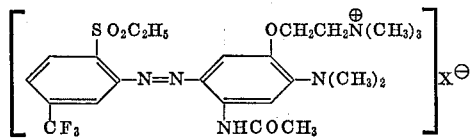

wherein X is an anion.

7. The dyestuff of claim 1 of the formula

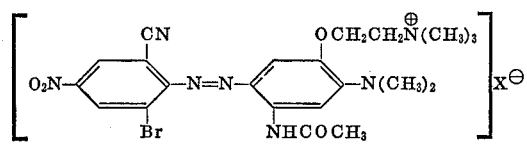

wherein X is an anion.

8. The dyestuff of claim 1 of the formula

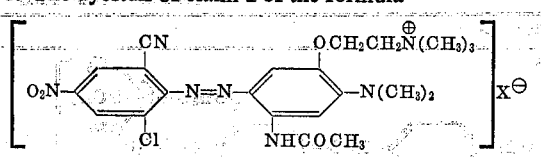

wherein X is an anion.

9. The dyestuff of claim 1 of the formula

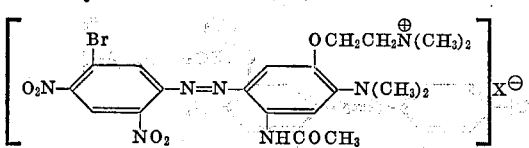

wherein X is an anion.

10. The dyestuff of claim 1 of the formula

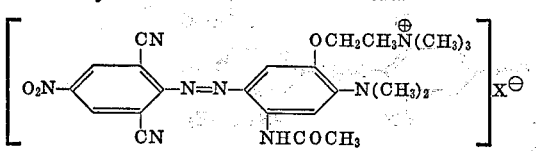

wherein X is an anion.

11. The dyestuff of claim 1 of the formula

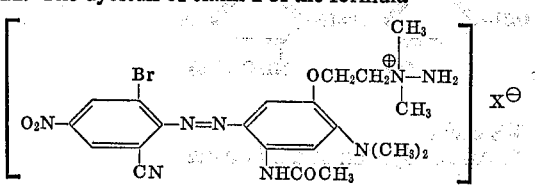

wherein X is an anion.

References Cited
UNITED STATES PATENTS

| | | | |
|---|---|---|---|
| 2,128,256 | 8/1938 | Krzikalla et al. | 260—156 X |
| 2,140,944 | 12/1938 | Schirm | 260—156 |
| 2,176,505 | 10/1939 | McNally et al. | 260—207 X |
| 2,219,280 | 10/1940 | Graenacher et al. | 260—156 |
| 2,224,112 | 12/1940 | Krzikalla et al. | 260—156 |
| 2,633,461 | 3/1953 | Seidenfaden et al. | 260—202 X |
| 2,853,483 | 9/1958 | Rhyner | 260—205 |
| 3,117,960 | 1/1964 | Illy | 260—156 |
| 3,148,181 | 9/1964 | Wallace et al. | 260—207 |
| 3,170,910 | 2/1965 | Neracher et al. | 260—156 X |
| 3,252,965 | 5/1966 | Entzehel et al. | 260—152 X |

FLOYD D. HIGEL, Primary Examiner

U.S. Cl. X.R.

260—146, 149, 152, 154, 155, 156, 157, 158, 163, 562 A, 570.7

UNITED STATES PATENT OFFICE
CERTIFICATE OF CORRECTION

Patent No. 3,642,769          Dated February 15, 1972

Inventor(s) Karl Ludwig Moritz, et al.

It is certified that error appears in the above-identified patent and that said Letters Patent are hereby corrected as shown below:

| Column | Line | Error |
|---|---|---|
| 2 | 29 | "such as" should be ---such as $-CH_2CH_2-$ --- |
| 2 | 71 | "arylamine" should be ---arylamino---. |
| 3 | 3 | "alkylthiol" should be ---alkylthio---. |
| 3 | Formula IV | " -alkyleneY" should be ---O-alkylene-Y--- 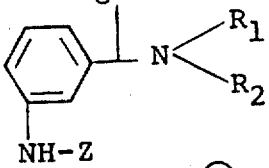 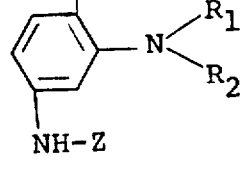 |
| 3 | Formula L65 | "$OCH_2CH_2\overset{\ominus}{N}(C_2H_5)_3$" should be ---$OCH_2CH_2\overset{\oplus}{N}(C_2H_5)_3$--- |
| 3 | Formula R65 | "$OCH_2CH_2N(C_2H)_25$" should be ---$OCH_2CH_2N(C_2H_5)_2$--- |
| 4 | Formula L10 | 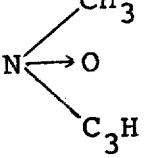 " should be --- 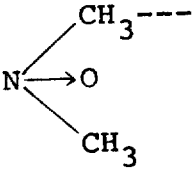--- |

-1-

UNITED STATES PATENT OFFICE
CERTIFICATE OF CORRECTION

Patent No. 3,642,769  Dated February 15, 1972

Inventor(s) Karl Ludwig Moritz, et al.

It is certified that error appears in the above-identified patent and that said Letters Patent are hereby corrected as shown below:

| Column | Line | Error |
|---|---|---|
| 6 | Formula IX | " 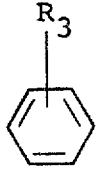 " should be --- 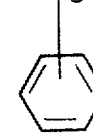 --- |
| 7 | Formula L15 | ".$HBF_4$" should be ---.$2HBF_4$--- |
| 11 | Formula IV | "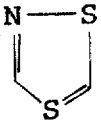" should be ---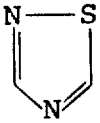--- |
| 11 | Formula V | "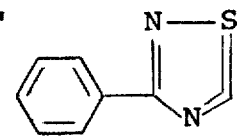" should be ---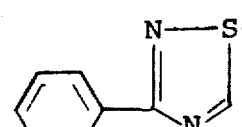--- |
| 15 | Formula IV | "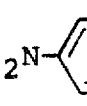" should be ---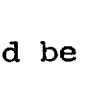--- |

UNITED STATES PATENT OFFICE
CERTIFICATE OF CORRECTION

Patent No. 3,642,769          Dated February 15, 1972

Inventor(s) Karl Ludwig Moritz, et al.

It is certified that error appears in the above-identified patent and that said Letters Patent are hereby corrected as shown below:

| Column | Line | Error |
|---|---|---|
| 15 | Formula VII | "Ph-OCH$_2$-N$^+$(CH$_3$)$_3$" should be --- Ph-OCH$_2$CH$_2$-N$^+$(CH$_3$)$_3$ --- |
| 15 | Formula IX | "Ph-OCH$_2$CH$_2$N$^+$" should be --- Ph-OCH$_2$CH$_2$N$^+$ --- |
| 17 | Formula I | "Ph-NHCOOCH$_3$" should be --- Ph-NHCOCH$_3$ --- |

-3-

UNITED STATES PATENT OFFICE
CERTIFICATE OF CORRECTION

Patent No. 3,642,769    Dated February 15, 1972

Inventor(s) Karl Ludwig Mortiz, et al.

It is certified that error appears in the above-identified patent and that said Letters Patent are hereby corrected as shown below:

| Column | Line | Error |
|---|---|---|
| 17 | Formula III | Please amend formula to read $$\text{---O-CH(CH}_3\text{)-C}_6\text{H}_5\text{---}$$ (with $CH_3$ on the CH, and phenyl ring attached to CH) |
| 18 | Formula line 40 | "$OCH_2-CH_2-Y$" should be ---$OCH_2-CH_2-Y'$--- |
| 20 | Formula line 10-15 | "$OCH_2CH_2N(CH_3)_2$" should be ---$OCH_2CH_2N(CH_3)_3$--- |
| 20 | Formula line 20 | "$OCH_2CH_3N(CH_3)_3$" should be ---$OCH_2CH_2N(CH_3)_3$--- |

Signed and sealed this 19th day of November 1974.

(SEAL)
Attest:

McCOY M. GIBSON JR.
Attesting Officer

C. MARSHALL DANN
Commissioner of Patents